Oct. 26, 1926.
S. G. DOWN
1,604,266
AUTOMOTIVE BRAKE MECHANISM
Filed Nov. 1, 1923
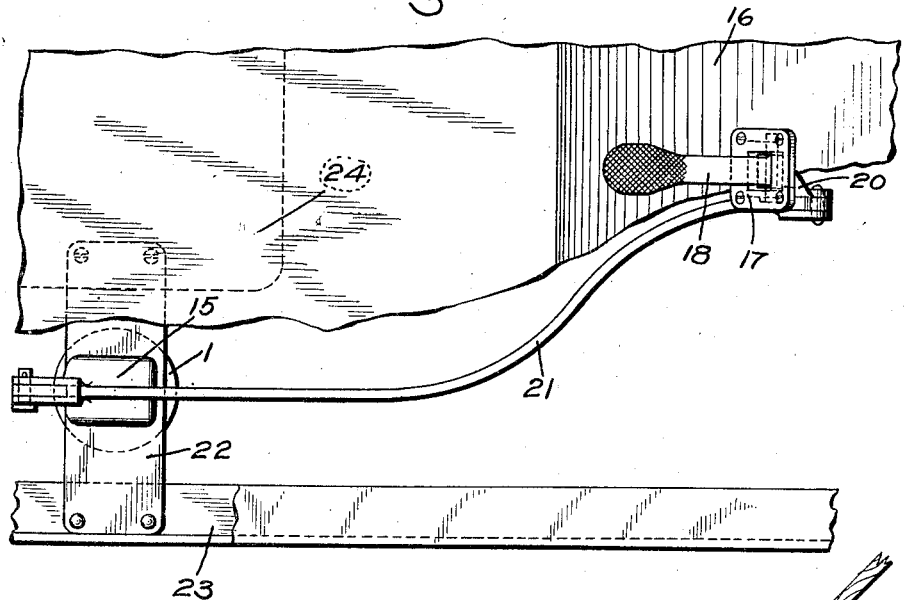
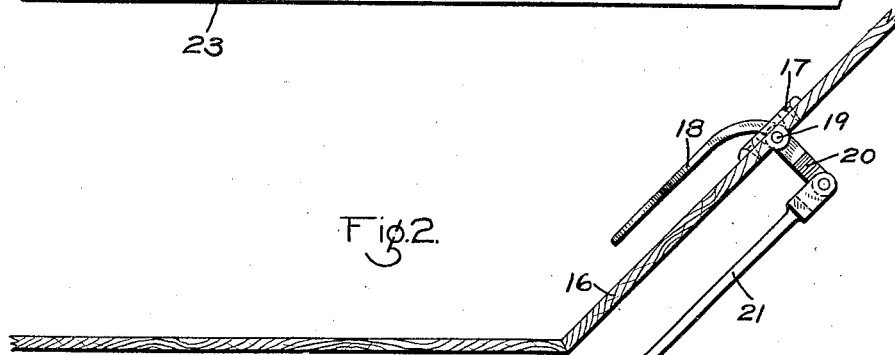
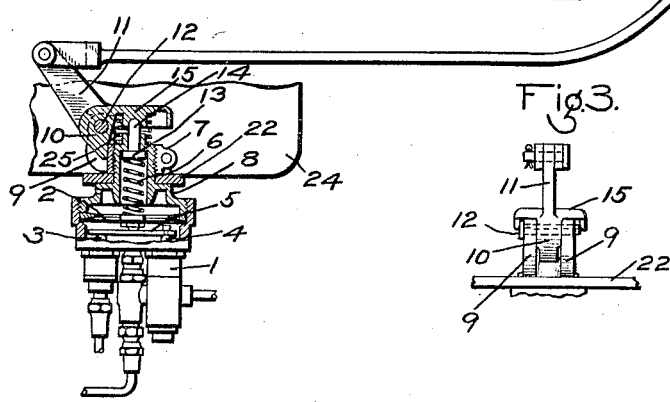
INVENTOR
SIDNEY G. DOWN
BY Wm. M. Cady
ATTORNEY Patented Oct. 26, 1926.

1,604,266

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE-BRAKE MECHANISM.

Application filed November 1, 1923. Serial No. 672,211.

This invention relates to brakes, and more particularly to a fluid pressure brake for automotive vehicles.

In a prior application of George S. Lane, Serial No. 448,884, filed March 1, 1921, there is disclosed a controlling valve device for controlling the admission and release of fluid under pressure to and from a brake cylinder or brake chamber. In this construction a diaphragm is provided for controlling an exhaust valve and a supply valve and a spring acts on the diaphragm, the pressure of which may be varied by the movement of a handle.

The principal object of my invention is to provide an improved foot controlled mechanism for varying the pressure of the spring in a controlling valve device of the above character.

In the accompanying drawing; Fig. 1 is a plan view of my improved foot controlled mechanism as applied on a motor vehicle to a fluid pressure controlling valve device; Fig. 2 an elevational view, partly in section, of the construction shown in Fig. 1, and Fig. 3 an end elevation of the controlling valve device.

The controlling valve device 1 as shown in the drawing is similar to the controlling valve device disclosed in the above mentioned application of George S. Lane, and comprises a casing having a chamber containing a diaphragm 2. At one side of the diaphragm 2, the casing contains a fluid pressure supply valve having an operating stem 3 and an exhaust valve having an operating stem 4. A plate 5 is associated with said valve stems and is operatively connected to the diaphragm 2, so that downward movement of the plate and diaphragm will operate stem 3 to open the supply valve, while upward movement thereof will operate the stem 4 to open the exhaust valve.

A spring 6 acts on the diaphragm 2 at the opposite side and according to my invention, the pressure of the spring 6 is varied by means of a foot controlled mechanism. For this purpose, a sleeve 7, having screw-threaded engagement with the cover plate 8 of the controlling valve device, is provided with lugs 9. Said lugs are spaced apart to receive a depending portion 10 of a lever 11, said portion being pivotally mounted on a pin 12 which extends through the lugs 9.

Within the cover plate 8, a spring plate 13 engages the spring 6 and said plate is provided with a stem 14 which extends through the cover plate 8 and engages the under face of a bonnet 15 carried by the lever 11.

Secured to the upper face of the floor board 16 of a motor vehicle is a plate 17 having a central rectangular opening for receiving a pedal lever 18. Said lever is pivotally mounted on a pin 19 having bearings in the plate 17 and is provided with an extended portion 20 which is pivotally connected to one end of a rod 21. The other end of said rod is pivotally connected to the end of lever 11.

In order to secure the controlling valve device 1 in position, a plate 22 is provided, having an opening to receive the upper threaded portion of the cover plate 8. The plate 22 is clamped securely to the controlling valve device when the sleeve 7 is screwed down and said plate may then be secured to the frame 23 and the transmission gear box 24.

When the pedal lever 18 is depressed by the foot, the rod 21 is pulled toward the right and the lever 11 is operated to move the bonnet portion 15 downwardly. The stem 14 is thus depressed, so as to compress the spring 6. The increased pressure on the diaphragm 2 causes the downward movement of the diaphragm so that the stem 3 is operated to open the supply valve for supplying fluid to the brake cylinder to effect an application of the brakes. When the foot is removed from the pedal lever 18, the pressure on spring 6 is relieved, permitting the brake cylinder pressure, acting on the under side of diaphragm 2, to lift said diaphragm and operate the stem 4 to open the exhaust valve and thereby release fluid from the brake cylinder. A spring 25 is interposed between the bonnet 15 and the cover plate 8 and tends to move and maintain the foot mechanism in release position.

Since the foot applied to the pedal lever 18 opposes the pressure of the spring 6, the operator is enabled to "feel" the degree of pressure which is being supplied to the brake cylinder.

The portion 10 of the lever 11 is adapted to engage the sleeve 7 in normal release position, so as to act as a stop to prevent further movement of the lever toward the left.

Having now described my invention, what I claim as new and desire to secure by Letters Patent, is:—

1. In a fluid pressure brake controlling device for motor vehicles, the combination with a brake valve device having a cover plate, of a sleeve having screw-threaded engagement with said plate, a pressure regulating spring associated with said brake valve device, a stem engaging said spring, lugs carried by said sleeve, a bonnet engaging said stem and pivotally mounted between said lugs, an arm rigidly secured to said bonnet, and a pedal operatively connected to said arm.

2. The combination with a fluid pressure controlling valve device having a cover plate, of a sleeve having screw-threaded engagement with said plate and a supporting plate for mounting said valve device on the motor vehicle and adapted to be secured between said cover plate and said sleeve.

In testimony whereof I have hereunto set my hand.

SIDNEY G. DOWN.